United States Patent [19]
Chenevert et al.

[11] 3,916,503
[45] Nov. 4, 1975

[54] METHOD OF MAKING THERMAL BARRIER LINEAL METAL SHAPES

[75] Inventors: Edward L. Chenevert; Joseph N. LaBorde; Robert E. Waltman, all of Baton Rouge, La.

[73] Assignee: Ethyl Corporation, Richmond, Va.

[22] Filed: Jan. 2, 1974

[21] Appl. No.: 430,099

[52] U.S. Cl. ............... 29/450; 29/509; 49/DIG. 1
[51] Int. Cl.² ........................................ B23P 11/02
[58] Field of Search.......... 29/450, 451, 235, 155 R, 29/526, 525, 509; 49/DIG. 1

[56] References Cited
UNITED STATES PATENTS

| | | | |
|---|---|---|---|
| 3,114,179 | 12/1963 | Briggs | 49/DIG. 1 |
| 3,411,254 | 11/1968 | Kessler | 49/DIG. 1 |
| 3,420,026 | 1/1969 | Nolan | 49/DIG. 1 |

FOREIGN PATENTS OR APPLICATIONS

| | | | |
|---|---|---|---|
| 290,352 | 9/1965 | Australia | 49/DIG. 1 |

Primary Examiner—C. W. Lanham
Assistant Examiner—James R. Duzan
Attorney, Agent, or Firm—Donald L. Johnson; John F. Sieberth; Paul H. Leonard

[57] ABSTRACT

A method of making a thermal barrier lineal metal shape wherein metal lineal shapes are extruded or otherwise formed to accept an insulating barrier previously formed in such a shape as to fit the metal lineal shapes. The insulating barrier is joined with the metal shapes by mechanical means to form a composite single-piece thermal break construction shape. Dimensional tolerances are essential.

11 Claims, 13 Drawing Figures

METHOD OF MAKING THERMAL BARRIER LINEAL METAL SHAPES

BACKGROUND OF THE INVENTION

The present invention is in the field of metal construction shapes and particularly those shapes used in the construction of metal windows and doors and frames therefor.

With the advent of metal construction used in curtain wall and other metal window and door enclosures, problems of heat conduction have arisen. The use of aluminum for the metal frames caused a greater transfer of heat between wall elements than had heretofore taken place in previous types of such construction. An insulation problem or the necessity for a thermal break construction element was thus essential. Various types of thermal breaks have been constructed, some of which have been satisfactory, but have been too costly. Other types have met with varying degrees of success.

Most thermal break constructions are currently formed by pouring in place an insulating material into the metal members or by mechanically joining the metal members and insulating member by deformation of the metal members. U.S. Pat. Nos. 3,204,324, 3,393,487, 3,624,885 and 3,634,565 are illustrative of the former type of constructions. U.S. Pat. Nos. 3,093,217, 3,114,179, 3,420,026, and 3,411,995 are illustrative of the latter type of construction. U.S. Pat. Nos. 3,411,254, 3,289,377, 3,055,468 and 2,654,920 disclose additional prior art thermal break constructions.

The present invention eliminates the necessity of expensive jigs which are required with pouring operations.

In the instant invention, unit deformation force required is substantially reduced. Heat generated by metal deformation is eliminated and metal marring and defacing is reduced.

Thermal break construction joints or lineal shapes of this invention have more uniform strength than prior art joints. They are simple and easy to fabricate. The use of jig boxes and table space are minimized.

It is a primary object of the present invention to provide a thermally insulating break in metal construction shapes by a mechanical interference fit.

SUMMARY OF THE INVENTION

The present invention relates broadly to a method of forming or incoporating a thermally insulating barrier or material in metal construction shapes. Metal lineal shapes are extruded or otherwise formed in such a manner so as to accept an insulating material or barrier previously formed in such a shape as to fit or be received by the metal lineal shapes. The insulating material is then joined with the metal shapes by mechanical means to form a composite single-piece construction material or shape. In effect, three lineal shapes, two metal and one insulating or plastic, are joined together by an interference fit to form the composite building shape.

Adhesives may be applied to the metal members, plastic members or both. The insulating materials may be plastic, wood, paper, foamed plastic, nylon, PVC, urethane, styrene, polyethylene, pressed wood, "Bakelite", glass, ceramic materials and the like. Plastic is preferred and some resiliency in the insulating material is also preferred. The metal shapes are preferably aluminum and may be extruded, cast, wrought, or otherwise formed. The term aluminum includes aluminum and aluminum alloys customarily used in the construction industry, especially in the making of windows, doors, curtain walls and frames therefor. Aluminum extrusions are preferred. Dimensional tolerances are essential.

DESCRIPTION OF THE PREFERRED EMBODIMENT

Figure 1:
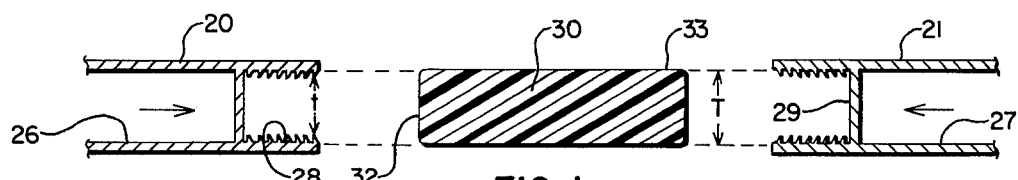
FIG. 1 is a view in cross-section illustrating the positions of one type of lineal metal shape and one type of lineal insulating shape just prior to being brought together to form the unitary thermal break construction element.

Referring now to the drawings, FIGS. 1, 1A and 2-5 illustrate various metal shapes or receptacles which are suitable for use in the present invention. FIGS. 1, 1A and 6-10 illustrate various insulating member shapes or barrier concepts which may be used in the instant invention. Any of the insulating members may be joined with any of the metal shapes and vice versa. A shape is defined as a product that is long in relation to its cross-sectional dimensions and has a cross-section other than that of sheet, plate, rod, bar, tube or wire. Metal shapes may be extruded, cast, wrought or otherwise formed. Aluminum extrusions are preferred. The insulating shape may also be extruded, cast or otherwise formed. Plastics are preferred, but all materials having thermal insulating properties are suitable.

Of the plastics, PVC (polyvinylchloride), and urethane foam are especially preferred. A cast polyurethane self-skinning foam or a free foam PVC are particularly recommended.

Figure 1A:
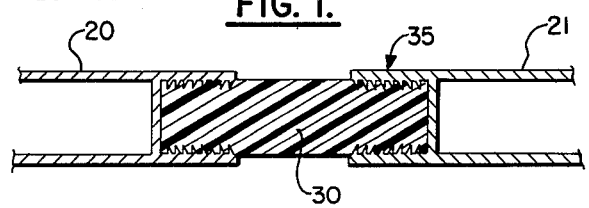
FIG. 1A is a view similar to that of FIG. 1 illustrating the unitary construction element formed by bringing together the lineal shapes shown in FIG. 1.

As can be seen in the drawings, the receptacles may be of various configurations. The opening or channel for receiving the insulating barrier is generally of a somewhat rectangular construction in cross-section. A receptacle configuration such as that of FIG. 1 is preferred, wherein a plurality of teeth or small projections extend from the receptacle in the receiving area for the barrier. When metal shape and barrier are brought together, as seen in FIG. 1A, the teeth protrude into the barrier to assist in holding it in a desired position. Suitable adhesives may be placed in the channel of the metal shape, on the barrier shape or on both such shapes so as to more firmly bond them together. With proper dimensional tolerances, gluing or adhesive joining can be eliminated entirely if desired.

Figure 7:
Figure 8:
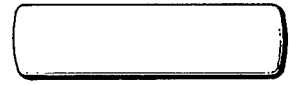
Figure 9:
Figure 10:

A barrier or insulating member of a configuration as seen in FIG. 7 is highly desirable as it provides a flush surface when joined with the receptacle of FIGS. 1–4. The barrier of FIG. 9 is especially suitable for the receptacle of FIG. 5. The barrier of FIG. 1 is the simplest and most economical barrier shape.

The size and weight of the receptacles and their corresponding barrier is largely determined by strength and use specifications. In general, sizing the barrier is a function of obtaining the overall strength, i.e. the minimum thickness required for a given application and desired interference fit within the receptacle. For a receptacle having teeth or similar type projection serrations, an interference formula of $T = t + 0.34t$ is desirable, where $T =$ total barrier thickness (inches) and $t =$ receptacle opening (inches). See FIG. 1; a "T" up to 0.270 inch has been tested. For a smooth receptacle, i.e. the types of FIGS. 2–5, the following formula is prepared: $T = t + 0.117t$. Tests have been made of a T up to 0.160 inches.

Figure 2:
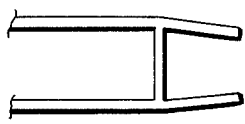
FIGS. 2-5 are cross-sectional views illustrating alternate forms of lineal metal shapes suitable for use in the instant invention.
Figure 3:
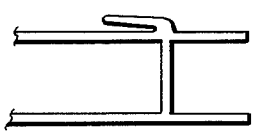
Figure 4:
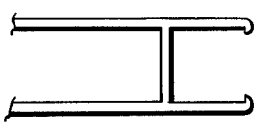
Figure 5:
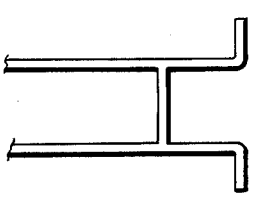
Figure 6:
FIGS. 6-10 are cross-sectional views showing alternate forms of lineal insulating members suitable for joining any of the various metal shapes seen in FIGS. 1-5.

When using aluminum, a receptacle of the type of FIG. 2 is not as desirable as the other shapes shown since aluminum has a tendency to push too far into the barrier. A hard, smooth barrier could overcome this limitation.

The two lineal metal shapes and the single lineal barrier or insulating shape are joined together by an interference fit to form a composite building shape. Predetermined designed and sized metal and barrier lineals are aligned and mechanically pushed together to form the interference fit between the barrier and the metal shapes. The lineals may be aligned in a brake and then pushed together or the lineals may be moved through a series of rollers which force the shapes together as they travel past the wheels. Adhesives may be used to supply some or all of the force required to hold the metal and barrier members together as a composite shape.

Figure 11:
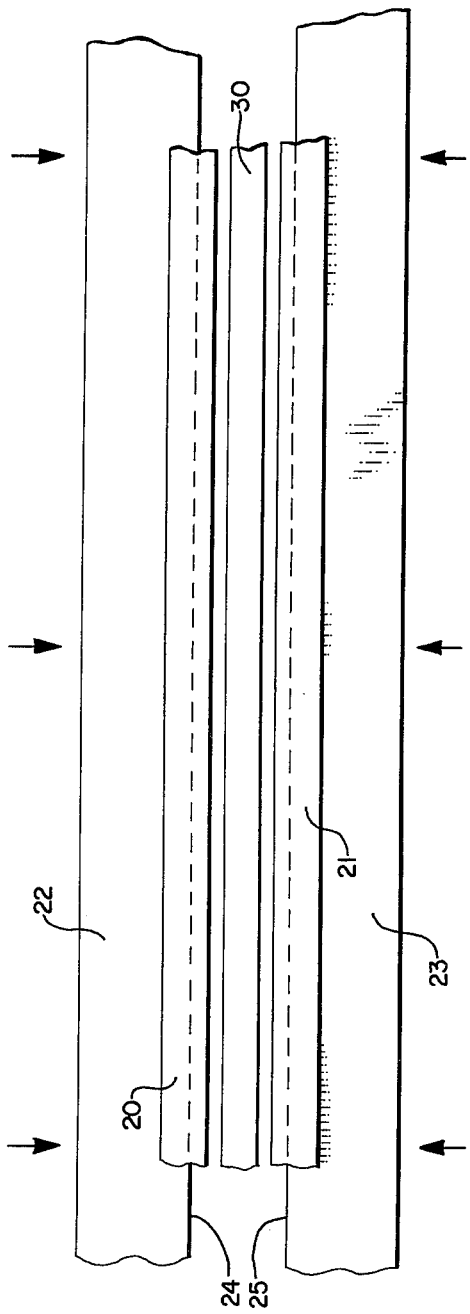
FIG. 11 is a top plan view illustrating one method of joining together the lineal metal and insulating shapes of FIGS. 1-10.

FIG. 11 illustrates one of the simplest forms of the present invention wherein lineal metal shapes 20 and 21 of the configuration of FIG. 1 are aligned in or between brake shoes or vice faces 22 and 23 respectively, wherein the edges 24 and 25 extend into the openings or channels 26 and 27, respectively. A barrier or insulating lineal shape 30 is placed between the metal shapes 20 and 21 and aligned therewith as shown in FIGS. 1 and 11. When the shapes are in this aligned position, forces are simultaneously applied to the brake shoes 22 and 23 so as to move them in the directions of the arrows. When the barrier 30 and metal shapes 20 and 21 are firmly joined together as shown in FIG. 1A, the brake shoes 22 and 23 are returned to their non-compressed or open positions and the composite or unitary construction shape 35 removed from the brake.

If desired or necessary, a suitable adhesive may be placed on the surfaces of the receptacle openings or channels 28 and 29 or on the surfaces 32 and 33 of the member 30 which are to be placed in said openings or on all of said surfaces.

Figure 12:
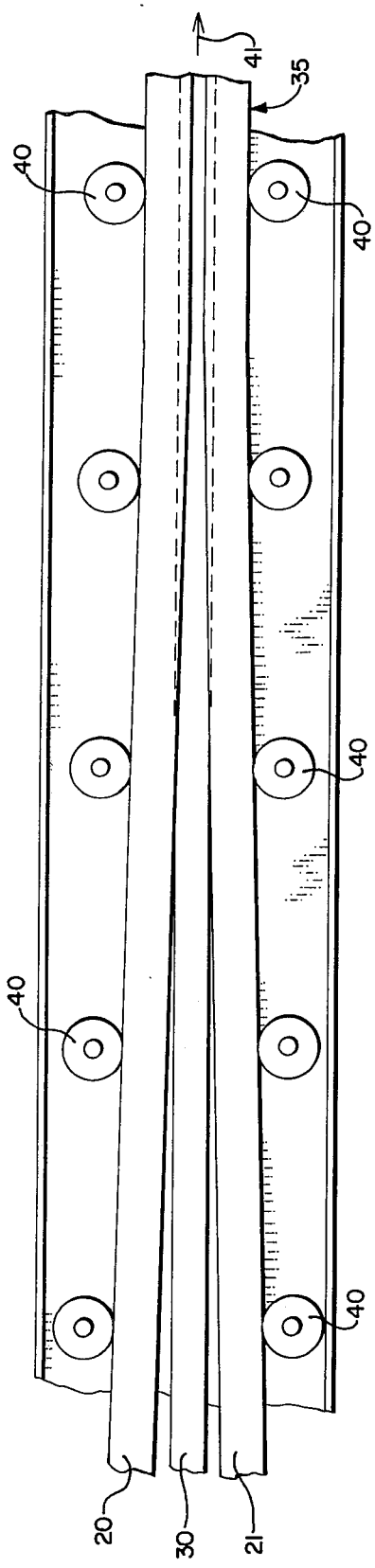
FIG. 12 is also a top plan view illustrating another method of joining together the lineal metal and insulating shapes of FIGS. 1-10.

In FIG. 12, which is another method of forming the interference fit, the members 20, 21 and 30 are aligned similarly as in FIG. 11 and then are moved and driven through a series of rollers 40 in the direction of the arrow 41 until the unitary shape or composite is formed. The rollers 40 are spaced apart at desired intervals with ever decreasing space therebetween. As the members 20 and 21 move through the rollers 40 in the direction of the arrow 41, they are moved towards the barrier 30 moving along therewith until the composite 35 is formed. The shapes 20, 21 and 30 may be fed into the roller by any suitable feed means.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A method of forming a thermal barrier lineal metal construction shape comprising the steps of:
   a. aligning a pair of lineal metal shapes adjacent each other in generally parallel spaced apart relation, each of said metal shapes having a top surface, bottom surface and vertical wall surface, and each of said metal shapes having a channel therein of a predetermined size adapted to receive a lineal insulating shape and one of said channels facing the other of said channels;
   b. aligning adjacent to said channels of said metal shapes and therebetween said channels, a lineal insulating shape adapted to be received by said channels, said insulating shape having a top surface, bottom surface and vertical side wall surfaces, and said insulating shape being of a predetermined size so related to the size of said channels that an interference fit is obtained when said insulating shape is inserted in said channels and,
   c. applying mechanical forces to move said channels of said metal shapes towards each other to thereby bring together the metal shapes and the insulating shape to form an interference fit between said metal shapes and said insulating shape, said interference fit occurring between the top surface and bottom surface of said lineal metal shapes and the top surface and bottom surface of said lineal insulating shape, thereby forming a unitary lineal thermal barrier construction shape.

2. The method of claim 1, wherein the channels for receiving the insulating shape have a plurality of projections integrally formed therein for protrusion into the insulating shape.

3. The method of claim 2, wherein the interference fit is produced by constructing the metal and insulating shapes in accordance with the formula $T = t + 0.34t$, wherein $T =$ total insulating shape thickness and $t =$ channel opening.

4. The method of claim 1, wherein the channels for receiving the insulating shape have substantially smooth surfaces.

5. The method of claim 4, wherein the interference fit is produced by constructing the metal and insulating shapes in accordance with the formula $T = t + 0.117t$, wherein $T =$ total insulating shape thickness and $t =$ channel opening.

6. The method of claim 1, wherein the channel of each lineal metal shape is formed by a pair of longitudinally extending legs joined together by a web.

7. The method of claim 6, wherein the legs forming the channel are tapered inwardly toward each other from the web joining them together.

8. The method of claim 6, wherein the legs forming the channel are substantially parallel to each other and have an internal projection on each end thereof.

9. The method of claim 1, wherein the lineal insulating shape has tapered and rounded edges thereon for facilitating the joining of the insulating shape with the metal shapes.

10. The method of claim 6, wherein the legs forming the channel are substantially parallel to each other and each has an end member extending outwardly therefrom at substantially right angles or perpendicularly thereto.

11. A method of forming a thermal barrier lineal metal construction shape consisting of the steps of:
   a. aligning a pair of lineal metal shapes adjacent each other in generally parallel spaced apart relation, each of said metal shapes having a top surface, bottom surface and vertical wall surface, and each of said metal shapes having a channel therein of a predetermined size adapted to receive a lineal insulating shape, each of said channels having a plurality of projections integrally formed therein for protrusion into the insulating shape, and one of said channels facing the other of said channels;
   b. aligning adjacent to said channels of said metal shapes and therebetween said channels, a lineal insulating shape adapted to be received by said channels, said insulating shape having a top surface, bottom surface and vertical side wall surfaces, and said insulating shape being of a predetermined size so related to the size of said channels that an interference fit is obtained when said insulating shape is inserted in said channels; and
   c. applying mechanical forces to move said channels of said metal shapes towards each other to thereby bring together the metal shapes and the insulating shape to form an interference fit between said metal shapes and said insulating shape, said interference fit occurring between the top surface and bottom surface of said lineal metal shapes and the top surface and bottom surface of said lineal insulating shape, thereby forming a unitary lineal thermal barrier construction shape.

* * * * *